United States Patent [19]

Mellott

[11] Patent Number: 5,854,322

[45] Date of Patent: Dec. 29, 1998

[54] COAL TAR PITCH MODIFIED BY NITRILE BUTADIENE RUBBER

[75] Inventor: Joseph W. Mellott, Uniontown, Ohio

[73] Assignee: The Garland Company, Cleveland, Ohio

[21] Appl. No.: 915,416

[22] Filed: Aug. 20, 1997

[51] Int. Cl.[6] .................................................. C08L 95/00
[52] U.S. Cl. ............................ 524/66; 524/61; 524/484; 524/485; 524/486
[58] Field of Search ............................... 524/66, 61, 484, 524/485, 486

[56] References Cited

U.S. PATENT DOCUMENTS

| | | | |
|---|---|---|---|
| 3,391,098 | 7/1968 | Kemp | 524/66 |
| 3,846,362 | 11/1974 | Reinecke et al. | 524/66 |
| 3,897,380 | 7/1975 | Walaschek | 260/85 |
| 5,455,291 | 10/1995 | Bruns | 524/66 |
| 5,578,663 | 11/1996 | McGovern | 524/66 |

*Primary Examiner*—James J. Seidleck
*Assistant Examiner*—Olga Asinovsky
*Attorney, Agent, or Firm*—Oldham & Oldham

[57] ABSTRACT

A modified coal tar pitch useful in roofing applications, containing coal tar pitch, and a nitrile butadiene rubber, is blended by heating the coal tar pitch to a molten temperature, adding the rubber in powder form and agitating the material in a suitable high shear mixing apparatus until adequate phase inversion occurs between the polymer and the coal tar phase. After preparation, the material is cooled in containers until use, at which time it is heated to a flowable temperature and applied using a roofing mop or squeegee.

10 Claims, No Drawings ly, the present invention relates to a roofing system where a molten modified coal tar pitch is used as a base, interply, and surface material for waterproofing of existing and new facilities. Even more specifically, the present invention relates to a modified coal tar pitch in which the coal tar pitch is modified by a nitrile-butadiene ("NBR") rubber. Even more specifically, the modified coal tar pitch is an emulsion consisting of a disperse coal tar pitch phase in a continuous NBR phase.

COAL TAR PITCH MODIFIED BY NITRILE BUTADIENE RUBBER

The present invention relates to a roofing material. Specifical

BACKGROUND OF THE ART

Pitch, particularly coal tar based pitch, is known to have many inherently advantageous properties with respect to its performance in roofing and waterproofing applications, including chemical resistance, ultraviolet resistance, and ozone resistance. However, it is also known that coal tar pitch has physical limitations to its use. For example, the low softening point of coal tar pitch limits it to low or no slope applications. Also, coal tar pitch is used with some reservation due to its high level of volatile emissions upon heating in kettle applications. In many cases, these emissions are known to be carcinogenic.

Some attempts have been made to modify coal tar pitch by blending it with thermoplastic elastomers such as polystyrene-polybutadiene-polystyrene ("SBS") type block copolymers. These materials have inherent problems with compatibility with coal tar pitch. Typical formulations based on SBS with coal tar pitch must employ compatibilizing agents such as extender oils to completely homogenize the blends. Softening occasionally occurs in blends of SBS with some coal tar pitch fractions, particularly, the aromatic fractions of the coal tar pitch which may weaken the intermolecular bonds of the polystyrene domains resulting in drifting, decreases in softening point and tensile performance.

Others have combined coal tar pitch and NBR latexes in aqueous emulsions for use with appropriate fillers for applying a sealing coat to asphalt pavements and other similar applications, but these compounds are not useful in the roofing applications anticipated by the present invention and do not provide any teaching about improvement of the softening and flow properties of a coal tar pitch.

For these and other reasons, it is desirable to modify a coal tar pitch to produce a material which softens at a higher temperature than unmodified coal tar pitch while maintaining the chemical and weather resistance. It is also desirable to eliminate some of the carcinogen exposure of the use of coal tar pitch.

SUMMARY OF INVENTION

It is, therefore, an object of the present invention to produce a high performance roofing product based on coal tar pitch that has enhanced temperature stability and lower accountable exposure to coal tar pitch fractions. It is also an object of the present invention to produce a modified coal tar pitch material that would have extended low temperature performance, and improved stress-strain performance.

These and other objects of the present invention are achieved by a modified coal tar pitch comprising coal tar pitch and nitrile butadiene rubber ("NBR"), wherein the coal tar pitch and the NBR are blended, and wherein the coal tar pitch is present in the range of from about 80 to about 96% by weight and the NBR is present the range of from about 20 to about 4% by weight.

DETAILED DESCRIPTION OF THE PREFERRED EMBODIMENT

The formulation of the invention contains two primary components: coal tar pitch and nitrile butadiene rubber. Additionally, other modifying agents may be present in minor amounts relative to the primary ingredients.

Coal Tar Pitch

Coal tar pitch is a dark brown to black colored amorphous residue left after coal tar is redistilled. It comprises a mixture of organic compounds, having as a primary component a variety of polynuclear aromatic ("PNA") hydrocarbons, with the PNA hydrocarbons typically having from 3 to about 40 aromatic rings, including some substituted compounds. Some estimates indicate that as many as 5,000 compounds may be present in a typical coal tar pitch. Coal tar pitches are classified into types, and the pitches useful in the present invention include those classified as Type I, Type I Low Fuming, or Type III. For the purposes of the present invention, a preferred coal tar pitch will have a softening point between 52° C. and 64° C.

Nitrile-butadiene rubber

Nitrile-butadiene rubber as used in the present invention is known in the industry under a variety of names, including acrylonitrile rubber, acrylonitrile-butadiene rubber, nitrile-butadiene rubber and NBR. It is a synthetic rubber made by random polymerization of acrylonitrile (which is also commonly known as vinyl cyanide) with butadiene using a free radical catalyst, or through alternating copolymers using Ziegler-Natta catalysts. In the typical NBRs available, the acrylonitrile content will vary between 20 and 50%, with the five basic levels of acrylonitrile content being: 20, 28, 33, 40 and 50%. Changing the acrylonitrile content in the NBR changes the number of pendant cyanide groups (—CN) along the chain, and the polar nature of these groups affect the properties of the co-polymer. A measure of the average molecular weight of an NBR sample is provided by the Mooney viscosity.

Additives

Any of a variety of additives may be employed to improve final properties of the modified coal tar pitch product. They may include but are not limited to fillers, antioxidants, antiozonants, oils, pigments, waxes, processing aids, alternative polymers, resins, fire retardant, or tackifiers. Types, amounts, and combinations of the alternative additives will vary based on the application type and desired performance.

General Preparation Method

A selected coal tar pitch having a softening point in the desired range is heated to approximately 176° C. in an apparatus equipped to maintain the temperature while agitating the pitch. Temperatures in the range of from about 93° C. to about 205° C. are believed to be appropriate for the preparation. Some example mixer types include paddle mixers, mixer emulsifiers, Cowles type dispersors, inline high shear mixers, and any other type which can produce adequate shear to disperse a solid polymer resin as added to the molten pitch. A powdered NBR having the desired properties is added to the molten coal tar pitch in slow even increments. The entire addition of the polymer should be over a period of about 15 minutes. Continued agitation of the blended pitch and NBR at temperature occurs until the NBR portion of the blend is homogenous in nature from visual observation. The exact time of blending is dependent on the temperature of blending, the shear mechanism utilized, and the average molecular weight of the NBR used. Although the blend starts off as a continuous phase of pitch with a disperse phase of NBR, a phase inversion will be observed visually. Confirmation of the phase inversion may be made using ultraviolet microscopy, since the NBR phase will fluoresce and the coal tar pitch phase will not. When the NBR concentration are in the lower portion of the range of interest, a complete inversion of phases may not be observable, in which case partial inversion should still be observed under microscopy.

For the purposes of this invention the following examples are provided to illustrate the improved properties of the modified coal tar pitch product. These formulations do not in any form limit the wide nature of the ability to formulate products based on coal tar pitch and NBR.

EXAMPLE 1

A Type I coal tar pitch with a softening point of 60° C. was charged to a jacketed heating vessel regulated at 177° C. and allowed to thermally stabilize for several minutes. A charge of a linear NBR having a 33% acrylonitrile content in powder form and dusted with a calcium carbonate partitioning agent was used for the experiments of Example 1. The NBR, designated as Polymer A hereinafter, is commercially available from Goodyear Chemical and is sold under the tradename CHEMIGUM P615. It typically has a Mooney viscosity of 60, and the $CaCO_3$ partitioning agent is present at about 9% by weight. The Polymer A charge was added in even increments and dispersed through the use of a high shear emulsifier type mixer. The specific mixer used was a Ross Model ME-100 LC. The blend was mixed for 60 minutes. Throughout the blending process, the mixture was observed visually for change in texture from grainy to smooth. The blend was also analyzed via the use of ultraviolet microscopy throughout the blending process to observe the inversion point of the blend. The inversion point for each blend was at or near the 60 minute point. Blending was terminated based on a smooth visual appearance and a complete inversion. Table 2 describes the exact formulation for each blend type.

In the experiment designated as 1A, Polymer A was added to the coal tar pitch such that 8 parts by weight of Polymer A were added to 92 parts by weight of coal tar pitch. Similarly, experiments 1B through 1E were conducted, as in Table 1.

TABLE 1

| Experiment % by weight | 1A | 1B | 1C | 1D | 1E |
|---|---|---|---|---|---|
| Coal Tar Pitch | 92 | 90 | 88 | 85 | 100 |
| Polymer A | 8 | 10 | 12 | 15 | 0 |

Experiment 1E was a control experiment where no Polymer A was added.

The resulting blends were analyzed for increases in softening point and tensile strength, and improved resistance to flow. Softening point, in °C., was measured according to ASTM Method D 95; tensile strength, reported in psi, was measured according to ASTM Method D 412; and flow resistance was measured according to ASTM Method D 5329. Table 2 describes the results of the first two analyses:

TABLE 2

| Experiment | 1A | 1B | 1C | 1D | 1E |
|---|---|---|---|---|---|
| Softening Point (°C.) | 79 | 80 | 85 | 83 | 60 |
| Tensile Strength (psi) | 520 | 263 | 253 | 194 | 194 |

As to flow resistance, ASTM Method D5329 is a "Pass/Fail" test, based on the length of flow of the material under specified test conditions. Under this test, the control specimen 1E flowed 141 mm, which was essentially the full length of the test field. The Experiment 1A material flowed 10 mm, which is considered a "fail", even though substantially improved from the control. The Experiment 1B and 1C materials each flowed 5 mm, which is considered a "pass", and the experiment 1D material flowed 2 mm, which is also a "pass."

As these data show, the softening point is increased by additions of Polymer A, while tensile strength is maximized by using lower quantities of Polymer A. Flow resistance is also significantly increased by additions of Polymer A. It is evident that through additions of Polymer A to coal tar pitch, the high temperature performance of the resulting blend is vastly improved. This increase in temperature stability allows the resulting blends to be used in much steeper slope applications without encountering flow problems that would be expected in an unmodified coal tar pitch.

EXAMPLE 2

The same procedure and coal tar pitch as in Example 1 was used for Example 2. However, the NBR was changed from Polymer A to Polymer B, which has a higher Mooney viscosity, which correlates to a higher average molecular weight. Specifically, Polymer B is also a linear NBR having a 33% acrylonitrile content in powder form and dusted with a calcium carbonate partitioning agent. Polymer B is commercially available from Goodyear Chemical and is sold under the tradename CHEMIGUM P609. It typically has a Mooney viscosity of 85, and the $CaCO_3$ partitioning agent is present at about 9% by weight. It is believed that this was the change which required an increase in the mixing time to two hours instead of one hour as in Example 1. In general, higher average molecular weight corresponds to longer mixing times for similar structured polymers. As in the Example 1 experiments, several runs were made using different amounts of Polymer B relative to the coal tar pitch, as the data in Table 3 show:

TABLE 3

| Experiment | 2A | 2B %, wt | 2C | 2D |
|---|---|---|---|---|
| Coal Tar Pitch | 92 | 90 | 88 | 100 |
| Polymer B | 8 | 10 | 12 | 0 |

The resulting blends were analyzed for increases in softening point and tensile strength, and improved resistance to flow, according to the same tests used in Example 1. Table 4 describes the results of the analysis.

TABLE 4

| Experiment | 2A | 2B | 2C | 2D |
|---|---|---|---|---|
| Softening Point (°C.) | 82 | 88 | 94 | 60 |
| Tensile Strength (psi) | 521 | 436 | 386 | 194 |

Under ASTM Method D5329, the control specimen 2D flowed 141 mm, which was essentially the full length of the test field. The Experiment 2A material flowed 3 mm, which is a "pass", as did the Experiment 2B material. The Experiment 2C material showed no flow under the test, and so it also was a "pass".

As previously described, there is a vast improvement in high temperature performance of the resulting formulation. There is also a substantial improvement in the tensile strength of the resulting blends.

In all blends described both in Example 1 and Example 2 there were significant increases in the high temperature performance of the resulting blends over the control coal tar pitch used. These improvements in performance would result in materials that would be suitable for use in roofing applications. Primarily the resulting formulations would be useful in applications where greater slope requirements are necessary. These blends may be used in kettle applied applications, as well as, starting formulations for further coal tar pitch related products, such as, but not limited to, coal tar pitch membranes, sealants, adhesives, crack fillers, surface coatings, interply bonding layers, and flashing applications.

In use as a roofing material, the modified coal tar pitch product of the present invention will be heated in a kettle at the point of use and applied using a roofing mop or squeegee, as is known in the art.

Although the preferred embodiments of the present invention have been described above in detail, the same is by way of illustration and example only and is not to be taken as a limitation on the present invention. Accordingly, the scope and content of the present invention are to be defined only by the terms of the appended claims.

What is claimed is:

1. A modified coal tar pitch consisting essentially of:
   a coal tar pitch having a softening point in the range of from about 52° C. to about 64° C.; and
   a solid-phase nitrile butadiene rubber ("NBR");
   wherein the coal tar pitch and the NBR are blended; and
   wherein the coal tar pitch is present in the range of from about 80 to about 96% by weight and the NBR is present in the range of from about 20 to about 4% by weight.

2. The modified coal tar pitch of claim 1 wherein the NBR has a Mooney viscosity in the range of from about 30 to about 85.

3. The modified coal tar pitch of claim 2 wherein the NBR comprises from about 20 to about 50% by weight acrylonitrile.

4. The modified coal tar pitch of claim 1 wherein the coal tar pitch is present in the range of from about 85 to about 92% by weight and the NBR is present the range of from about 15 to about 8% by weight.

5. The modified coal tar pitch of claim 1 wherein the softening point of the modified coal tar pitch is greater above 70° C.

6. The modified coal tar pitch of claim 1 wherein the softening point of the modified coal tar pitch is at least 10° C. higher than the softening point of the coal tar pitch prior to modification.

7. The modified coal tar pitch of claim 1 wherein the coal tar is a disperse phase in a continuous phase of the NBR.

8. A process for manufacturing a modified coal tar pitch, comprising:
   a) heating a coal tar pitch having a softening point in the range of from about 52° C. to about 64° C. to a temperature at which the coal tar pitch is molten and comprises a continuous phase;
   b) adding a solid-phase nitrile butadiene rubber ("NBR") as a disperse phase to the molten coal tar pitch to form a molten blend having a coal tar continuous phase; and
   c) agitating the molten blend until a phase inversion occurs and the NBR component is the continuous phase of the blend.

9. The process of claim 8 wherein the process is conducted at a temperature in the range from about 93° C. to about 205° C.

10. The process of claim 8 wherein the NBR is added in slow even increments over a period of about fifteen minutes in step b).

* * * * *